Patented Aug. 15, 1939

2,169,361

UNITED STATES PATENT OFFICE 2,169,361

VARNISHES, VARNISH FORMING SUBSTANCES, AND METHODS OF PRODUCING SAME

Siegfried Kohn, Philadelphia, Pa., assignor to The Resinous Products & Chemical Company, Philadelphia, Pa.

No Drawing. Application May 15, 1931, Serial No. 537,746

15 Claims. (Cl. 260—25)

My invention relates to oil soluble varnish-forming bodies and specifically contemplates the provision of substances which when dissolved in varnish oils, such as China-wood oil, Perilla oil and linseed oil, give rise to quick drying varnishes capable of forming coatings of unusual hardness, brilliance, elasticity and durability.

It is a well known fact that oil varnishes made with the aid of natural resins, such as rosin or ester gum, can be materially improved if for their preparation, instead of plain natural resins, combinations of natural resins and synthetic resins are used. Heretofore, it was considered essential that the compounds incorporated in drying oils for the production of varnishes, actually be of resinous character and not of crystalline character. These compounds of resinous character have always been formed by a relatively high aldehydic condensation of simple and complex phenols, such as, phenol, the cresols, the phenyl-phenols, the xylenols and the naphthols.

I have found that complex phenolic bodies, such as, the crystalline complex phenols, for example, the naphthols, the phenyl-phenols, and the like, especially those complex phenolic crystalline bodies formed by the condensation of phenols and ketones, and crystalline and non-crystalline complex phenols, of the group represented by derivatives of phenol of a higher molecular weight than cresol, particularly the alkyl derivatives such as the xylenols, butyl phenol, amyl phenol and the like and the polyhydric phenols such as resorcinol, and pyrogallol and hydroxy-acids, such as salicylic acid and the like, without the use of aldehydes, form highly satisfactory varnishes when mixed with a proper amount of a natural resin, preferably rosin, and dissolved in a varnish oil. These complex phenols can be prepared by the introduction of further methyl groups into cresols to form xylenols, and the derivatives of a higher order, by condensation of simple phenols with a ketone (dihydroxy-diphenyl-dimethyl methane) by condensing cyclohexanone with phenols, or by the addition of other benzol rings to simple phenols (naphthols, phenyl-phenols, etc.). The best results have been produced by the use of complex crystalline phenols obtained by condensation of phenols and ketones.

Representative and most efficient of the complex crystalline phenols obtained by the condensation of phenols and ketones which I have used for this purpose is dihydroxy-diphenyl-dimethyl methane which is produced by the condensation of phenol and acetone and has the following structural formula:

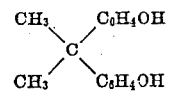

Phenols of this class are represented by the type formula:

in which X represents an alkyl group, such as, methyl, ethyl, and the like, and in which Y represents an hydroxy-phenyl group or one of its derivatives, such as, an hydroxy-methyl-phenyl group.

These complex phenols are preferably mixed with equal parts by weight of a natural resin, preferably rosin, and dissolved in a varnish oil, preferably China-wood oil, by heating at a relatively low temperature, preferably between about 450° to 480° F. until the desired viscosity is obtained, usually about an hour. The ratio of phenol to resin can be varied but for the best results one should not use more phenol than resin and not more than 11 parts of resin to 9 parts of phenol. The amount of oil used can be varied to suit the desired viscosity. Best results, however, are obtained with seven parts of oil for each part of phenol, the parts being by weight.

The resulting product can be thinned to the desired consistency with the usual thinners, such as petroleum distillates and turpentine. The usual driers can be added. The varnish so produced dries in from 2 to 4 hours and gives coatings of unusual brilliance, hardness, elasticity and durability.

I have further found that these complex phenols can be replaced in whole or in part by their condensation products with formaldehyde under certain conditions which also form a part of my invention. Hitherto it has been customary in the production of resins of the phenol-aldehyde varieties to use every expedient to render the resin as free as possible from free phenols. I discovered that very valuable resins for use in varnishes can be produced by condensing these complex phenols with not more than ¾ of a mole of formaldehyde per mole of phenol. The optimum proportions are ½ mole and less of formaldehyde per mole of complex phenol; good results are obtained, however, up to ¾ of a mole of formaldehyde per mole of phenol, especially if no catalysts are used, after which the utility of the product in the production of varnishes decreases with every increase in the ratio of formaldehyde to phenol. These resins contain a considerable quantity of free phenol which can be detected in and isolated, at least in part, from varnishes produced therefrom. It is by this characteristic that my varnishes can be readily distinguished from those of the prior art.

An important fact to be considered in measuring the utility of these resins is that, whereas with the synthetic varnish resins hitherto in use, for example, those set forth in United States Patent 1,736,757, it was necessary to use a relatively large proportion of natural resin, the amount of synthetic resin in the mixture never exceeding 20% and, as a rule, not exceeding 10%, my new resins are capable of producing good varnishes when mixed with natural resins in proportions up to and exceeding equal parts by weight. In fact, the best varnishes are produced with those mixtures of my resins with natural resins which more nearly approach equal parts of each. This increased ratio of synthetic resin to natural resin made possible by my resins, accounts for the fact that they can be successfully used to produce "long oil" varnishes, those produced by heating at relatively low temperatures and characterized by the exceedingly high durability, hardness and elasticity of their coatings.

An economic advantage of my invention lies in the fact that, contrary to the usual method of compounding the synthetic resin-natural resin varnish base by first catalytically condensing the phenol and the aldehyde and then mixing the resulting condensation product with the required amount of natural resin and subjecting the mixture to a condensation treatment, I have discovered that the desired result can be attained by slowly adding the phenol and the aldehyde in the proper proportions to the natural resin in the fused state and then, after all the phenol and aldehyde have been added, usually in about an hour, raising the temperature to about 135° C. and heating at this temperature until a reaction product melting at about 50° is obtained. The attainment of the desired product is usually indicated by a cessation of the foaming of the reaction mass, but may be more definitely ascertained by cooling a sample and determining its melting point.

My new resins can be used with natural resins and varnish oils in the same proportions as those indicated above for the free complex phenols but, unlike the free complex phenols, the resins do not require an equal amount of natural resin, but give rise to satisfactory varnishes without as well as with the use of natural resins. When my new resins are used alone, the best results are obtained by incorporating them in about seven parts by weight of varnish oil for every two parts by weight of resin although the proportions of oil to resin can be varied within reasonable limits, depending upon the viscosity of varnish desired. The varnishes so produced are not possessed in the same degree of the advantages of those produced from the combination of my new resins with natural resins or of those produced from the free phenols with natural resins, but are, nevertheless, eminently satisfactory when measured by the practical standards of the varnish art and are in many respects superior to varnishes produced from the combination of natural resins with phenol-aldehyde resins resulting from the condensation of phenols with more than ¾ of a mole of aldehyde per mole of phenol.

Insofar as my invention is concerned with resins produced by the condensation of phenols with not more than ¾ of a mole of aldehyde per mole of phenol, it is not limited to complex crystalline phenols, such as, beta-naphthol and those complex phenols resulting from the condensation of simple phenols with ketones, and non-crystalline complex phenols, like the xylenols, but also contemplates the use of simple phenols, such as, phenol itself and its lower homologues, such as, mixed cresols, etc. These simple phenols, when condensed with not more than ¾ of a mole of formaldehyde, preferably not more than ½ of a mole of formaldehyde, per mole of phenol, provide resins which are soluble in varnish oils with the production of varnishes.

Like the resins produced from the complex phenols these resins can be combined with natural resins. They combine with natural resins in the proportions stated for the free complex phenols and, when so combined, form bases for very satisfactory varnishes. Although it is not absolutely necessary to use natural resins with these new simple phenol aldehyde resins, their use is in many instances conducive to much better varnishes than these produced from said resins alone. The varnishes produced from these resins, however, while they are satisfactory from a utilitarian point of view, do not possess the markedly superior qualities of the varnishes produced from the complex phenols, especially dihydroxy-diphenyl-dimethyl methane and its condensation products with aldehydes.

Wherever formaldehyde is referred to in this specification it is to be understood that the use of any compound containing the methylene group, such as, paraformaldehyde, hexamethylene tetramine and the like is also contemplated. Likewise wherever natural resins are referred to, it is to be understood that in all cases rosin is preferred although ester gum and similar natural resins, as well as aromatic organic compounds of pronounced acid character are also contemplated.

The incorporation of my aldehyde-phenol condensation products into the new varnish can be carried out in different ways; for instance, in a one-step process by heating together the oil, the phenol, and paraformaldehyde, with or without the natural resin, in suitable proportions, or by reacting upon a mixture of a natural resin and phenol with paraformaldehyde, and then incorporating the resin obtained into a drying oil, and finally by the customary three-step process consisting in first condensing the phenol and formaldehyde, then combining the product of condensation with a natural resin and then incorporating this combination into a drying oil. This last three-step procedure has been almost exclusively practiced heretofore, but the important point which distinguishes the present invention is the effect of an extremely low formaldehyde ratio. Heretofore, it was considered essential to carry the condensation of the synthetic resin to completion by correspondingly high amounts of formaldehyde, with the result that the resins produced could be used only for the production of a certain limited group of varnishes, and that they were excluded, for instance, from being applied in the production of low temperature long oil varnishes. The characteristic feature of the new varnishes, which are one of the objects of the present invention, is that due to their novel composition, they can be prepared by a low temperature long oil cook, with all the advantages of increased durability, hardness, light resistance, etc., accruing from same.

The following examples represent practical embodiments of my invention and are given as illustrations of the nature of in contradistinction to the scope of the same. Unless otherwise designated, all parts are by weight.

*Example 1*

A mixture of 1 part of dihydroxy-diphenyl-dimethyl methane and 1 part of rosin is heated to about 450° to 480° F. in 7 parts of China-wood oil until a satisfactory viscosity is obtained. Heating for about an hour is usually sufficient. The varnish so obtained is thinned with 10 parts of petroleum distillate or turpentine and the usual driers are added. When the resulting varnish is applied to any surface, a coating is obtained which dries in from 2 to 4 hours and which is possessed of unusual hardness, brilliance, elasticity and durability. The dihydroxy, diphenyl-dimethyl methane can be replaced by other crystalline complex phenolic bodies whether obtained by the condensation of a phenol with a ketone or not, as well as by non-crystalline complex phenols, such as, the xylenols.

*Example 2*

To 80 parts of aqueous formaldehyde containing about 37% of formaldehyde and 2 parts of caustic soda, dihydroxy-diphenyl-dimethyl methane is added in a sufficient quantity to form a thin slurry at a temperature of between 50° and 60° C. The mixture so obtained is stirred at this temperature until its consistency is substantially decreased, whereupon a further addition of the complex phenol is made. Stirring is continued with periodical additions of the complex phenol until about 570 parts of the latter have been added. The temperature is then raised to about 90° C., at which point it is kept until the smell of formaldehyde has almost completely disappeared. The resulting condensation product is easily soluble in varnish oils. A satisfactory varnish is obtained by heating a quantity of this condensation product representing 2 parts of dihydroxy-diphenyl-dimethyl methane (preferably after removal of most of the water) with about 7 parts of China-wood oil in the manner described in Example 1, thinning with petroleum distillate or turpentine and adding any suitable drier. The compatability with thinners is in this case more restricted than in Example 1. Any other complex crystalline phenolic body obtained by the condensation of a phenol with a ketone can be substituted for the dihydroxy-diphenyl-dimethyl methane without any substantial alteration of the result.

*Example 3*

If after the 570 parts of dihydroxy-diphenyl-dimethyl methane have been added to the formaldehyde in Example 2 and the mixture heated at about 90° C. until the smell of formaldehyde has dispersed, 570 parts of fused rosin are added and the temperature carefully raised, as fast as the foam generated by the reaction will permit, to 125–135° C., and kept at this temperature until the water is expelled, or until a melting point of about 50° C. is obtained, a remarkable oil soluble varnish forming substance is produced. 2 parts of this product dissolved in 7 parts of China-wood oil in the manner described in Example 1, and thinned with 10 parts of petroleum distillate or turpentine and combined with any common drier results in a varnish which gives coatings of a hitherto unobtainable hardness and durability.

*Example 4*

143 parts of rosin are fused and brought to a temperature of 110 to 120° C. A previously prepared mixture of 143 parts of dihydroxy-diphenyl-dimethyl methane and 8 parts of paraformaldehyde is added to the fused rosin in the course of about one hour. After this addition is complete the temperature is raised to 135° C. The reaction is interrupted as soon as the foaming of the reaction mixture ceases, or, as soon as a sample of the reaction mixture when cooled has a melting point of about 50° C. 2 parts of this reaction mixture when combined with China-wood oil, a thinner and a drier in the manner and in the proportions set forth in Example 1 produce a varnish similar in properties and degree of excellence to the varnish obtained in Example 3. This varnish as well as the varnishes obtained in Examples 1, 2 and 3, is characterized by a high content of a free complex phenol which may be easily detected and at least in part isolated. This content of free phenol greatly enhances the compatability of the varnishes with mineral thinners and, at the same time, is unaccompanied by the disadvantages, such as odor and adverse effect in the varnish cook and a tendency to lower the resistance of the finished varnish to alkali and to light which are usually occasioned by the presence of free low molecular weight phenols in varnishes.

Having thus described the nature and objects of my invention and given illustrative embodiments of the same, what I now claim as new and useful and desire to secure by Letters Patent is:

1. As a new article of manufacture a varnish containing an oil-soluble condensation product obtainable by condensing less than ¾ of a mol of formaldehyde with one mol of a crystalline complex phenol, obtainable by the condensation of a phenol with a ketone.

2. As a new article of manufacture a varnish containing an oil-soluble condensation product obtainable by condensing less than ¾ of a mol of formaldehyde with one mol of a complex phenolic body represented by the formula

in which X represents an alkyl group and Y represents an hydroxyphenyl group or a methylated hydroxyphenyl group.

3. As a new article of manufacture a varnish containing an oil-soluble condensation product obtainable by condensing less than ¾ of a mol of formaldehyde with one mol of dihydroxy-diphenyl-dimethyl methane.

4. As a new article of manufacture a varnish containing the reaction product of a natural resin and a condensation product of one mol of a complex phenol obtainable by condensing a phenol with a ketone with less than ¾ of a mol of formaldehyde.

5. As a new article of manufacture a varnish containing a reaction product of rosin and a condensation product of dihydroxy-diphenyl-dimethyl methane with less than ¾ of a mol of formaldehyde per mol of dihydroxy-diphenyl-dimethyl methane.

6. As a new article of manufacture a varnish containing a reaction product of a natural resin, dihydroxy-diphenyl-dimethyl methane and formaldehyde, the ratio of formaldehyde to dihydroxy-diphenyl-dimethyl methane being less than ¾ of a mol of the formaldehyde per mol of the latter.

7. As a new article of manufacture the reaction product of a natural resin and a condensation product of one mol of a complex phenol obtainable by condensing a phenol with a ketone with less than ¾ of 1 mol of formaldehyde.

8. As a new article of manufacture the reaction product of rosin, dihydroxy-diphenyl-dimethyl methane and formaldehyde, the ratio of formaldehyde to dihydroxy-diphenyl-dimethyl methane being less than ¾ of a mol of the former per mol of the latter.

9. As a new article of manufacture the reaction product of rosin and the condensation product of dihydroxy-diphenyl-dimethyl methane with less than ¾ of a mol of formaldehyde per mol of dihydroxy-diphenyl-dimethyl methane.

10. The process of producing an oil soluble varnish-forming substance which comprises heating a natural resin to the fusion point and adding a crystalline complex phenol represented by the formula

in which X represents an alkyl group and Y represents an hydroxyphenyl group or a methylated hydroxyphenyl group, and anhydrous formaldehyde in the proportions of less than ¾ of a mol of formaldehyde per mol of said phenol, raising the temperature to about 135° C. and heating the mixture until a product melting at about 50° C. is obtained.

11. The process of producing an oil soluble varnish-forming substance which comprises heating a natural resin to the fusion point and adding dihydroxy-diphenyl-dimethyl methane and formaldehyde in proportions of less than ¾ of a mol of the latter per mol of the former thereto, raising the temperature to about 135° C. and heating the mixture at this temperature until a product melting at about 50° C. is obtained.

12. The process of producing an oil soluble varnish-forming substance which comprises heating 1 mol of a complex crystalline phenol obtainable by condensing a phenol with a ketone with less than ¾ of a mol of aqueous formaldehyde to a temperature of about 90° C. until the odor of formaldehyde has substantially disappeared.

13. As an article of manufacture an oil-soluble condensation product of a crystalline complex phenol represented by the formula

in which X represents an alkyl group and Y represents a hydroxy-phenyl group or a methylated hydroxyphenyl group with less than ¾ of a mol of formaldehyde per mol of complex phenol.

14. As an article of manufacture an oil-soluble condensation product of 1 mol of dihydroxy-diphenyl-dimethyl-methane with less than ¾ of a mol of formaldehyde.

15. As a new article of manufacture, a member of the group consisting of (1) an oil soluble condensation product obtainable by condensing less than ¾ of a mol of formaldehyde and one mol of a complex crystalline phenol, obtainable by the condensation of a phenol and a ketone and (2) a condensation product of the class defined, modified by a natural resin.

SIEGFRIED KOHN.